United States Patent [19]
Griffiths

[11] 4,008,513
[45] Feb. 22, 1977

[54] CLASP

[76] Inventor: Kenneth F. Griffiths, 31 London Terrace, New Rochelle, N.Y. 10804

[22] Filed: Sept. 24, 1975

[21] Appl. No.: 616,298

[52] U.S. Cl. .............................. 24/201 A; 24/201 S; 24/239; 403/315

[51] Int. Cl.² .................. A44B 17/00; A44B 13/02

[58] Field of Search ....... 24/201 S, 201 BN, 201 A, 24/201 R, 239; 403/315; 16/172

[56] References Cited

UNITED STATES PATENTS

| | | | |
|---|---|---|---|
| 382,611 | 5/1888 | Howe | 24/239 |
| 556,661 | 3/1896 | Burress | 24/201 A |
| 845,654 | 2/1907 | Layng | 24/201 BN |
| 1,769,645 | 7/1930 | Hummelgard | 16/172 |
| 2,444,666 | 7/1948 | Orain | 403/315 |
| 2,497,337 | 2/1950 | Ackerman | 16/172 |
| 3,161,149 | 12/1964 | Monus | 24/201 A |
| 3,570,078 | 3/1971 | Neumann | 24/201 BN |

FOREIGN PATENTS OR APPLICATIONS

| | | | |
|---|---|---|---|
| 861,308 | 2/1941 | France | 24/239 |
| 245,261 | 4/1912 | Germany | 24/201 S |
| 1,202,083 | 8/1970 | United Kingdom | 24/239 |

*Primary Examiner*—Bernard A. Gelak

[57] ABSTRACT

A male and female element each having one or more prongs for mating engagement with each other. The prongs of the female element have downwardly extending slots for receiving a transverse bar contained in a prong of the male element. A pushing member is provided in the female element for urging the bar into the slots and for holding the bar therein.

9 Claims, 14 Drawing Figures

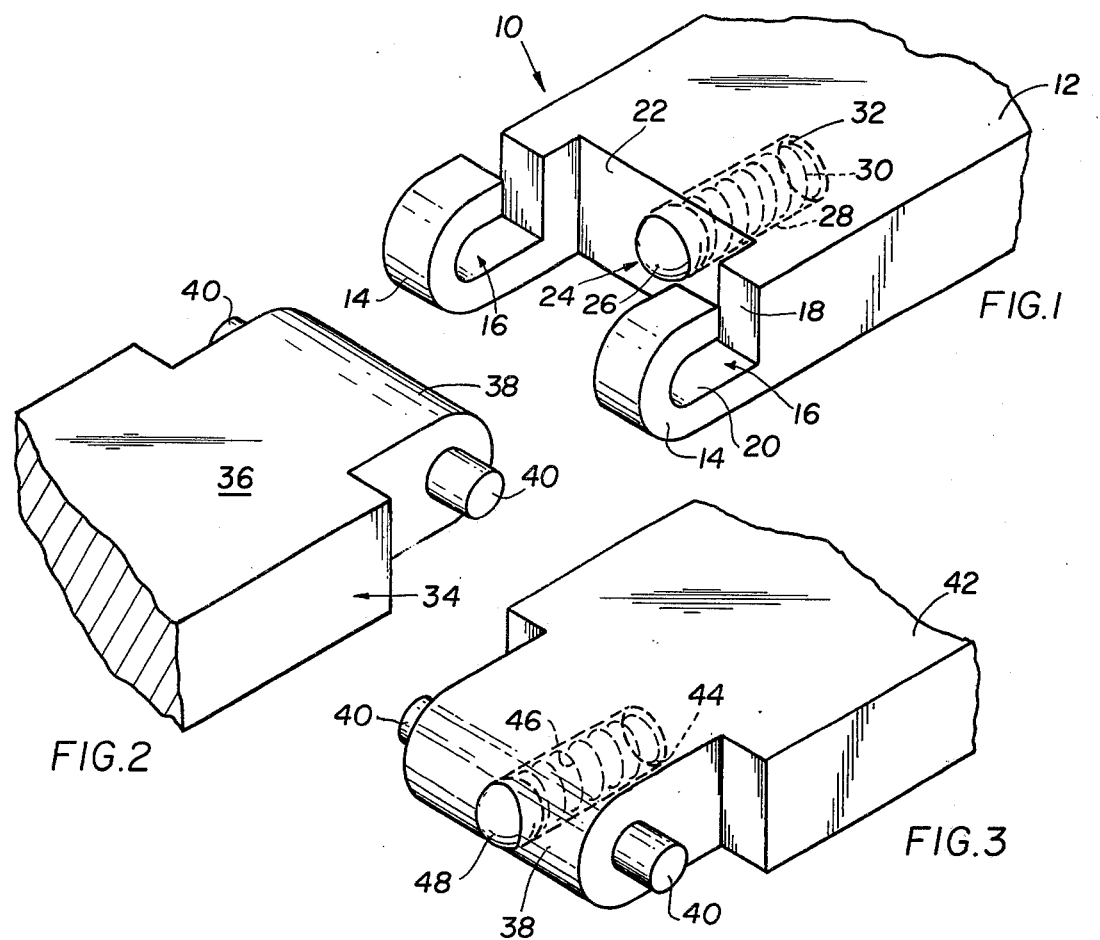
FIG.1
FIG.2
FIG.3
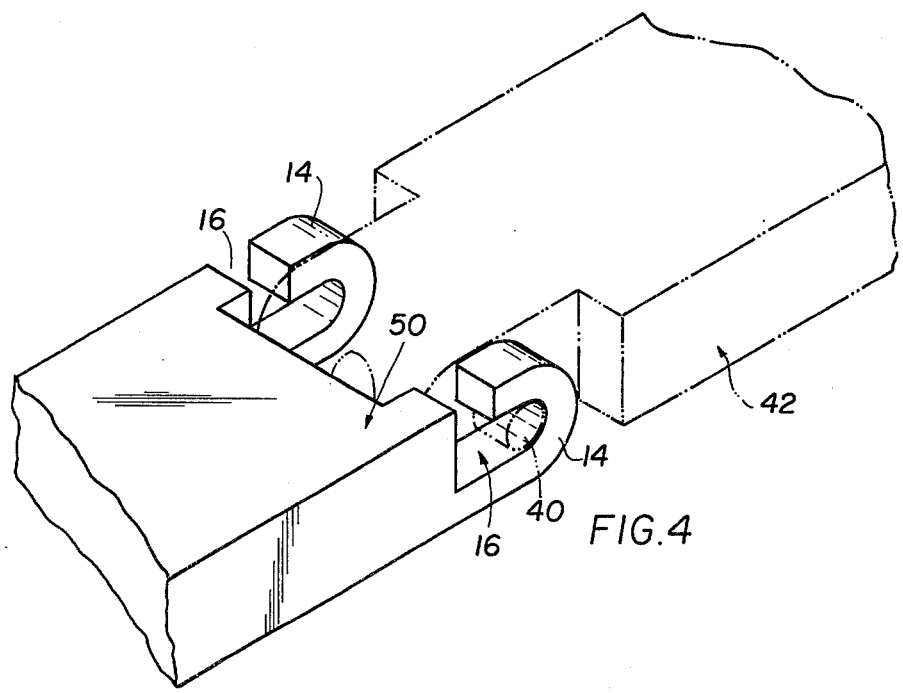
FIG.4

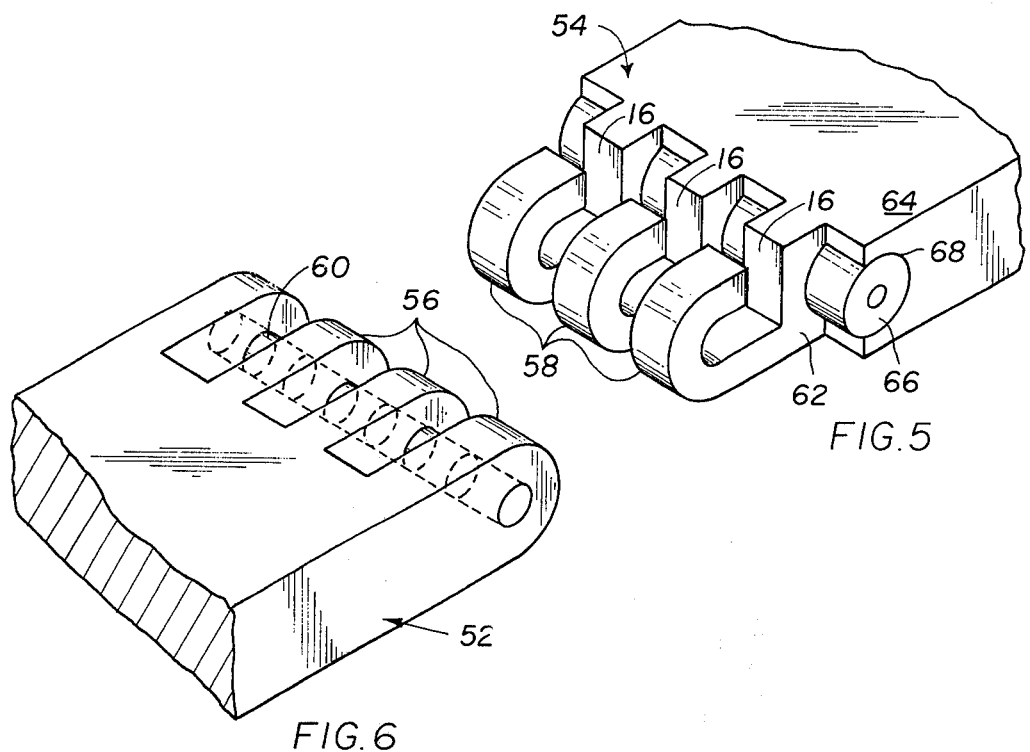
FIG. 5
FIG. 6
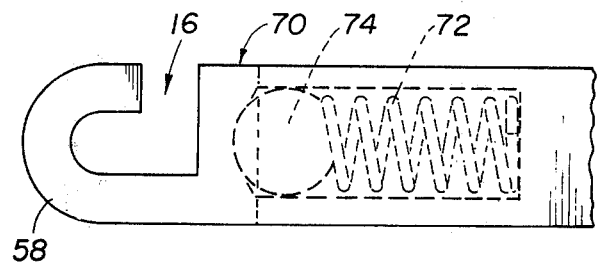
FIG. 7
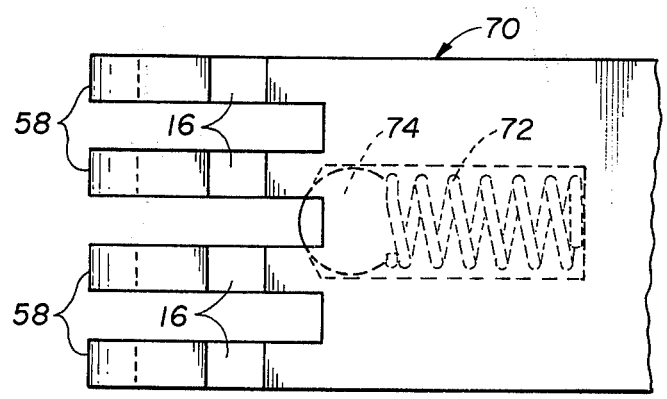
FIG. 8

CLASP

BACKGROUND OF THE INVENTION

The present invention is directed to a clasp for use with bracelets, watch bands, belts and the like.

Numerous types of clasps are known and are used in many items where frequent opening and closing is required. However, there are no clasps presently available that are simple in construction and easy to use. It is therefore the prime object of the present invention to provide a clasp that not only is simple to produce but is easily opened and closed by a user with one hand.

It is another object of the present invention to provide a clasp which is strong, may be manipulated many times and which will not break after prolonged use.

It is still another object to provide a clasp which is secure and will hold during use, even under violent strain and action on the part of the wearer.

These objects, as well as others, together with the numerous advantages of the present invention will be obvious from the following disclosure.

SUMMARY OF THE INVENTION

According to the present invention a clasp is provided with a male and a female element; the male element having at least one prong extending from its front surface while the female element has at least two hook-shaped prongs with an L-shaped slot formed therein for the reception of a bar contained in the prong or prongs of the male element. In order to steadfastly secure the male and female elements together, and to provide for easy closing and opening of the clasp, at least one pushing or buffer member is provided that resiliently urges the male element into the end of the horizontal part of the L-shaped slot.

In one embodiment of the present invention, only one male prong is provided whose outwardly extending bar is received in the slots of two prongs formed in the female element.

While generally the buffer or pushing element is located in the female member at least in one embodiment of the present invention the pusher or buffer member is provided in the male element; the pusher or buffer member urging the bar of the male element into the end position of the horizontal part of the L-shaped slots.

In still another embodiment of the present invention, a plurality of prongs are provided on both the male and female elements. In some instances the number of prongs are either one greater on the female element or one greater on the male element.

Full details of the present invention are set forth in the following description of the preferred embodiment and are shown in the attached drawings.

BRIEF DESCRIPTION OF THE DRAWING

In the drawing:

FIG. 1 is a perspective view of the female element of the clasp of the present invention;

FIG. 2 is a perspective view of the male element of the clasp of the present invention which mates with the female element shown in FIG. 1;

FIG. 3 is a perspective view of the female element of another embodiment of the clasp of the present invention;

FIG. 4 is a perspective view of the male element mating with the female element of FIG. 3 of the clasp of the present invention;

FIG. 5 is a perspective view of the female element showing the use of a plurality of prongs and slots;

FIG. 6 is a perspective view of the male element showing the use of a plurality of prongs for mating engagement with the slots of the female element of FIG. 5;

FIG. 7 is a side view showing the use of a pushing spring and ball as the pushing mechanism in the female element of FIG. 5;

FIG. 8 is a plan view showing the spring and ball of FIG. 7;

DETAILED DESCRIPTION OF THE INVENTION

Figure 9:
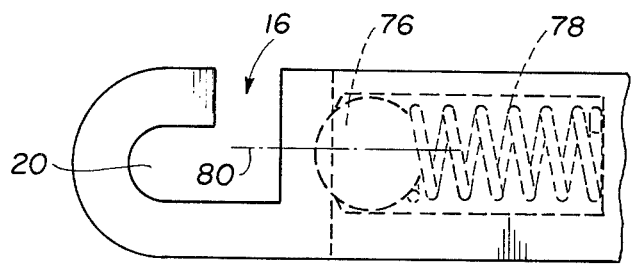
FIGS. 9-11 show the different positions of the pushing mechanism in the female element used in any of the disclosed embodiments.

Referring now to the drawings, in which like reference numerals indicate like parts, there is shown in FIG. 1 a clasp comprising a female element, generally referred to by the numeral 10. The female element 10 is made up of a main body portion 12 from which extends two receiving prongs 14, each of which has an L-shaped slot 16 having a vertical portion 18 and a horizontal portion 20. Mounted centrally in the main body portion 12 and extending axially from a front vertical wall 22 is a pushing mechanism generally depicted by the numeral 24. The pushing mechanism comprises a ball 26 slidable within a bore 28 formed in the main portion 12, the ball 26 being resiliently urged in the outwardly direction from the bore 28 by a spring 30 contained in the bore 28. The spring 30 has one end firmly attached at 32 to the inner end of the bore 28 and the other end firmly attached to a portion of the ball 26.

Alternatively, the ball 26 may be held in the bore 28 by securing a plate having a hole therein, of smaller diameter than the bore, to the front wall 22; the hole being sufficiently large to allow a substantial portion of the ball to protrude therefrom, but small enough to prevent its falling out. The spring in this embodiment need not be secured at its ends.

In FIG. 2, there is shown a male element generally depicted by the numeral 34 for mating engagement with the female element of FIG. 1. The male element has a main body portion 36 which is cut down at its front end to form an inserting prong 38, which has a transverse width corresponding to the distance between the receiving prongs 14 of the female member, so as to be insertable therebetween. Extending laterally from each side of the inserting prong 38 is a rigid connecting bar 40, which has a length and overall diameter sufficient to slidably fit in the L-shaped slot 16.

The bar 40 may be round, square or rectangular in cross-section. The thickness of the both female and male members are substantially the same, and the front edge of the inserting prong should have sufficient surface to be engageable solely by the ball 26, although it too may be rounded or square, (i.e. convex or flat).

To connect the clasp shown in FIGS. 1 and 2, the male element 34 is brought into the vicinity of the female element 10, and the bar 40 is made to slide down the vertical portion 18 of the slots 16. Upon first contact of the male and female elements, the front surface of inserting the prong 38 will abut against the ball 26 in the female element and push the ball back into the opening 28, thereby compressing the spring 30. Upon the continued downward movement of the bar along the vertical portion 18 of the slots, the horizontal portion 20 will be reached, allowing the ball 26, in response to the biasing of the spring 30, to push the entire male element outwardly causing the bars 40 to move at least part way or more often completely to the end of the horizonal portion 20 of the L-shaped slots 16. The ball and spring arrangement will thereafter firmly hold the two elements in place by its constant biasing effect and provide a strong yet easily operable clasp mechanism.

It is to be noted that the ball 26 is continuously urged outwardly by the spring 30 so that when there is no load on the ball, the ball will extend outwardly from the opening a certain distance. The distance the ball extends should not be too great so that it interferes with the easy closing and opening of the clasp and not too small so that it does not provide an adequate pushing force on the male element. This distance may be adequately controlled by the proper choice of the ball diameter and diameter of the opening through which it protrudes.

In FIGS. 3 and 4 there is shown a modification of the clasp shown in FIGS. 1 and 2. The clasp of FIGS. 3 and 4 is similar in most respects to the preceeding embodiment and bears the same reference numerals for similar parts. However, here the pushing mechanism is in the male element, rather than in the female element. The male element 42 has generally the same central inserting prong 38 and laterally extending bars 40 as in the first embodiment, but here the inserting prong and main body portion is provided with a bore 44 extending rearwardly from the prong face. Mounted within the bore is a spring 46 similar to the spring shown in FIG. 1 and is attached at one end to a ball 48. The female element 50 shown in FIG. 4 is provided with the same spaced receiving prongs 14 and L-shaped slots 16 as shown in FIG. 2. Therefore, as the male element is brought close to the female element, the bar 40 may be slid down the slots 16 until it reaches the horizontal portion of the slots. Upon reaching the horizontal portion of the slots, the ball and spring mounted in the male element will perform the same locking function as the pushing mechanism shown in FIGS. 1 and 2.

The male and female elements may contain a plurality of prongs in order to achieve a more secure and safer closing, as well as one which is different decoratively. As shown in FIGS. 5 and 6, male element 52 and female element 54 are provided with a plurality of identical parallel prongs 56 and 58, respectively. Male element 52 is provided with a bar 60 extending across the entire width of the male element. Portions of the bar are exposed between each of the prongs. The bar 60 extends through a series of aligned transverse holes which are spaced from the forward end of the prongs 56 as well as from the rearward ends, to allow the prongs 56 to be inserted in the receiving prongs of the female member.

Female element has a plurality of L-shaped prongs 58 similar in structure to those of FIG. 1 and FIG. 4. Each prong 58 has a base portion 62 extending from the main body portion 64 of the female element, the base portions 62 forming therebetween a space for the exposure of a resilient buffer 66. The buffer 66 is mounted within the base portions 62 through a corresponding hole 68 formed transversely through each.

When the male element 52 is brought into engagement with the female element 54, the bar 60 is slid down the vertical portions of the slots while at the same time being bias outwardly by the extending portions of the buffer 66. The buffer 66 contacts the male element at the most forward parts of the prongs 56, the distance from the bar 60 to the front-most portion of the prongs being greater than the distance from the outer-most parts of the exposed buffer to the end of the horizontal portion of the slot, thereby making sure that a biasing force is always exerted on the male element to urge it away from the female element. The buffer 66 may be held in place by any conventional means such as metal caps pressed into both ends of the opening, and may be made of any suitable resilient material such as rubber, neoprene, or the like, as a single rod or serial rods. A helical coil may also be used.

A pushing mechanism similar to that shown in FIGS. 1 and 3 may be used in lieu of the buffer 66 when the male and female elements both contain a plurality of prongs. As shown in FIGS. 7 and 8, such pushing mechanism is mounted midway of a female element 70, which is like that of FIGS. 5 and 6 and has a spring 72 and ball 74 mounted in an opening in the female element. The ball 74 is urged outwardly by the spring to bias the bar of the male element into the horizontal portion of the slot. If a more firm biasing force were desired, a plurality of such pushing mechanisms may be provided as for example one each, in the rear of each slot.

Figure 10:
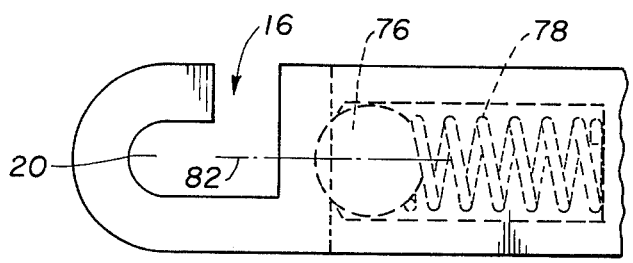
Figure 11:
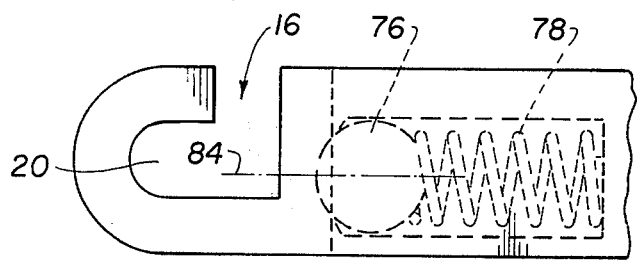

Whether one or a plurality of pushing mechanisms containing a ball and spring are used, the positioning of the ball relative to the slot 16 will determine the force at which the bar of the male element will be urged into the end of the horizontal portion of the slot. In FIGS. 9–11, there are shown different positions of the ball and spring relative to the horizontal portion of the slot.

In FIG. 9, a ball 76 and spring 78 having a central axis 80, are positioned above the central plane of the female element and also above the horizontal portion 20 of the slot 16 such that the ball and spring urge the bar and male element into the horizontal portion of the slot both downwardly and to the left as viewed in FIG. 9. Such positioning of the ball and spring will create a maximum holding force on the bar and male element since to remove the bar from the slot, the downward force exerted by the ball 76 must first be overcome.

In FIG. 10, the ball 76 and spring 78 have a central axis 82 at the central plane of the female element and are aligned with the central axis of the horizontal portion 18 of the slot 16. Then they provide only a force on the male member which is axially positioned, i.e. to the left as viewed in FIG. 10. Such arrangement will provide a holding force less than that of FIG. 9 since there is no downwardly acting forces on the bar and male element.

In FIG. 11, the ball 76 and spring 78 have a central axis 84 below the central plane of the horizontal portion of the slot. This will offer the least holding force on the bar and male element. This is because there is in addition to a force acting to push the bar and male element axially to the left in FIG. 11, an upwardly acting force due to the placement of the axis 84 below the central axis of the horizontal portion.

Therefore, by the particular positioning of the ball and spring relative to the horizontal portion of the slot, the opening and closing of the clasp of the present invention may be made progressively harder or easier.

Figure 12:
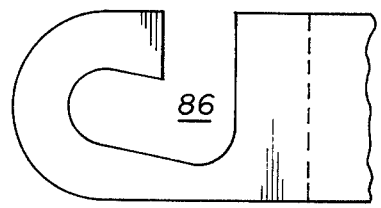
FIGS. 12-14 show, in side views, some of the different shapes of the slots in the prongs of the female element in any of the disclosed embodiments.
Figure 13:
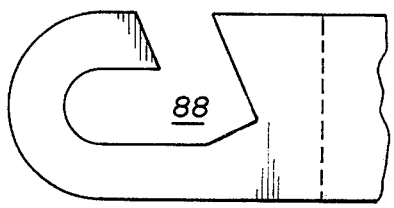
Figure 14:
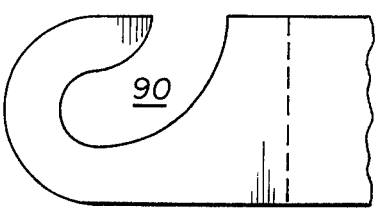

FIGS. 12–14 show some of the possible shapes the slots of the female element may take. In FIG. 12, the horizontal portion 86 of the slot is tilted upwardly, while in FIGS. 13 and 14, the horizontal portions 88, 90 are level and bent downwardly, respectively. In any element the effect of an L-shaped slot, providing for downward or inward movement and then generally axial movement is accomplished. Such slots may be used in any one of the female members shown herein.

While specific embodiments of the invention have been shown and described, it is to be understood that numerous modifications may be made without departing from the scope of the invention. For example, the slots in the prongs of the female element need not contain a horizontal portion, but may merely have a vertical portion, provided that it has a lower portion against or in which the bar of the male element may abut and be adapted to seat firmly into thereafter be held by the resilient action of the buffer or pusher element.

It will be appreciated that the clasp of the present invention may be attached to any strap, belt, necklace or other product in conventional manner. While not shown herein, the other ends of the male and female members have conventional means for fastening to these products, such as holes for belts, screws, sewing threads, hooks etc.

It is also clear that the several different elements of the shown embodiments may be combined and permutated in any manner desired. It is therefore intended that the present disclosure be illustrative only of the present invention and not at all limiting of its scope.

What is claimed is:

1. A clasp comprising a male element, having a main body portion, at least one prong extending axially outwardly from said main body portion, and exposed bar means extending laterally from said at least one prong, and a female element having a main body portion, at least two prongs extending axially outwardly from said main body portion to receive said male portion and extend along the lateral edges of said prongs on said male portion, each of the prongs from said female element having an L-shaped slot formed therein for receiving said bar means of said male element; each of said L-shaped slots comprising a vertical portion extending in a common plane transverse to the axis of said female element and a horizontal portion extending in a common plane axially away from the main body of said female element, and pushing means mounted within the main body portion of one of said male or female elements and normally biased outwardly therefrom for resiliently engaging the main body portion of the other element, said pushing means and said main body portion of the other element having cooperatively engaging faces adapted to cause said pushing means to yield axially inward on the downward movement of said bar into the vertical portion of said L-shaped slot, and axially outward to force said bar into locking engagement within the horizontal portion of said L-shaped slot.

2. The clasp according to claim 1, wherein said pushing means comprises a ball, and a spring having a first end engaging said ball, said main body portion of said female element comprising an axial bore extending through a portion thereof mounting said spring and said ball therein, said spring having a second end engaging the inner most end of said opening.

3. The clasp according to claim 1, wherein said pushing means comprises a ball, a spring having a first end engaging to said ball, said main body portion and said at least one prong of said male element having an opening extending therethrough mounting said spring and said ball therein, said spring having a second end engaging to the inner most end of said opening.

4. The clasp according to claim 1, wherein each of said male and female elements comprises a plurality of prongs spaced from each other said bar means comprising a bar extending between the outermost prongs of said male element, said bar being exposed in the spaces between adjacent prongs, and said pushing means comprising an elastic buffer extending between the outermost prongs of said female element, said buffer being exposed in the spaces between adjacent prongs, so that when the prongs in the male element are inserted in the spaces between the prongs of the female element, the buffer will urge said male element into said slot.

5. The clasp according to claim 2, wherein each of said male and female elements comprises a plurality of prongs forming a space between adjacent ones of said prongs, said pushing means being situated in said main body portion of said female element near the space formed by the middle one of said prongs, said ball extending partially into said space when said male element is removed from said female element.

6. The clasp according to claim 2, wherein said slot comprises a vertical portion and a horizontal portion below said vertical portion, said spring and ball having a central axis mounted above the top of said horizontal portion of said slot.

7. The clasp according to claim 2, wherein said slot comprises a vertical portion and a horizontal portion below said vertical portion, said spring and said ball having a central axis mounted in alignment with a central axis of said horizontal portion.

8. The clasp according to claim 2, wherein said slot comprises a vertical portion and a horizontal portion below said vertical portion, said spring and said ball having a central axis mounted below the bottom of said horizontal portion of said slot.

9. The clasp according to claim 1, wherein said slot comprises a portion transverse to the central plane of said clasp and a portion extending at an angle to said transverse portion and said central plane.

* * * * *